April 9, 1957  D. B. LONES  2,788,009
AUTOMATIC WASHING APPARATUS
Filed March 18, 1954  3 Sheets-Sheet 1
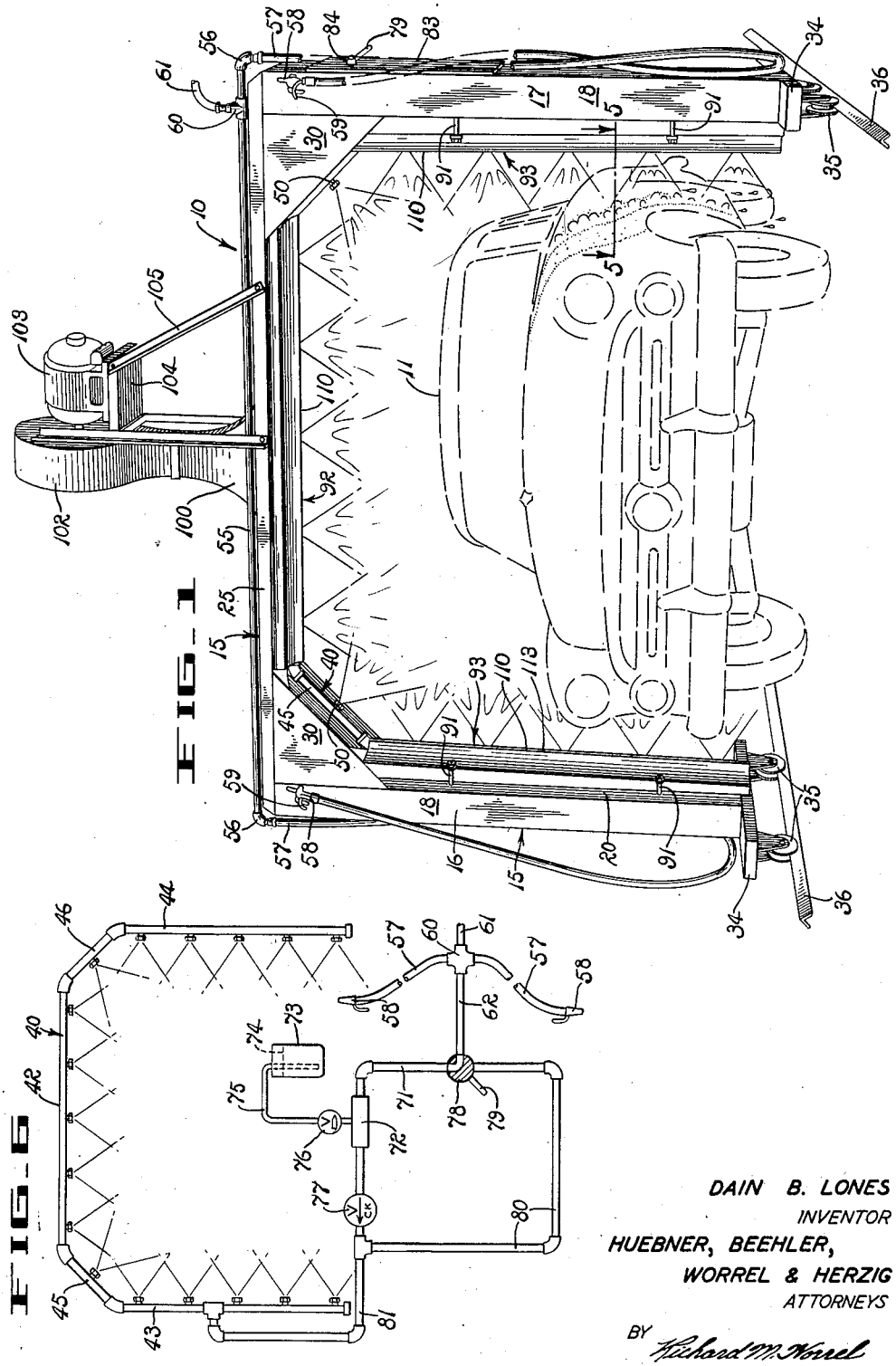
DAIN B. LONES
INVENTOR
HUEBNER, BEEHLER,
WORREL & HERZIG
ATTORNEYS April 9, 1957 D. B. LONES 2,788,009
AUTOMATIC WASHING APPARATUS
Filed March 18, 1954 3 Sheets-Sheet 2
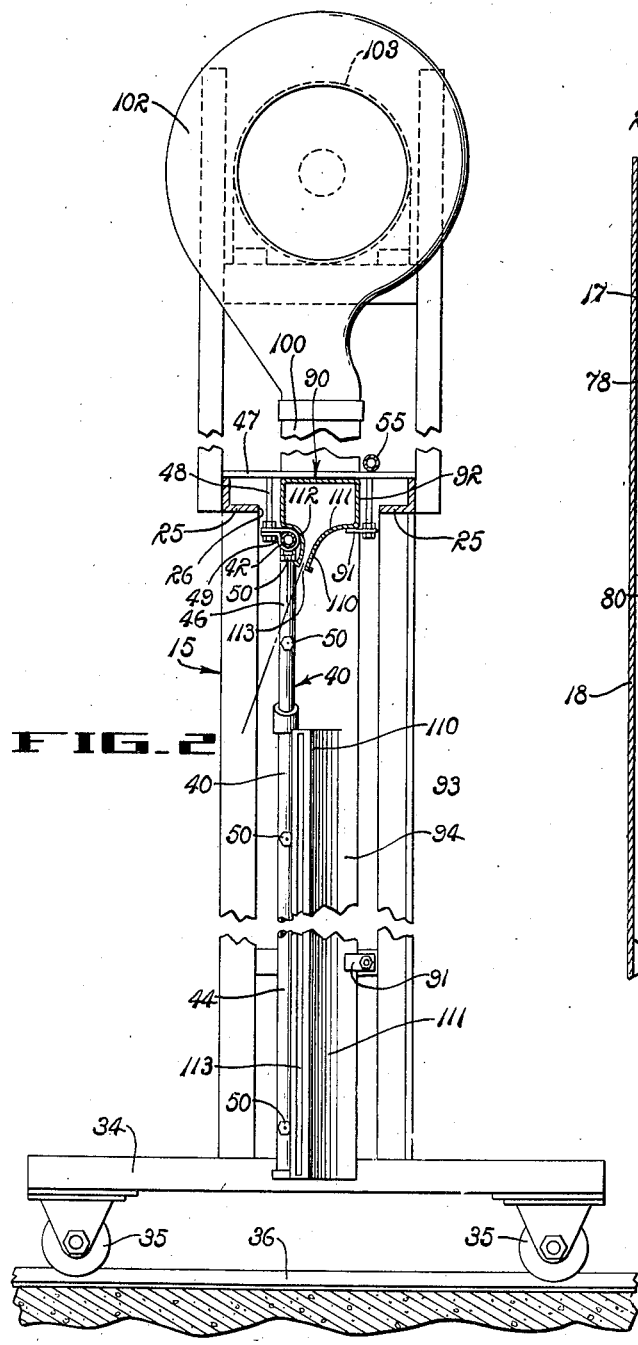
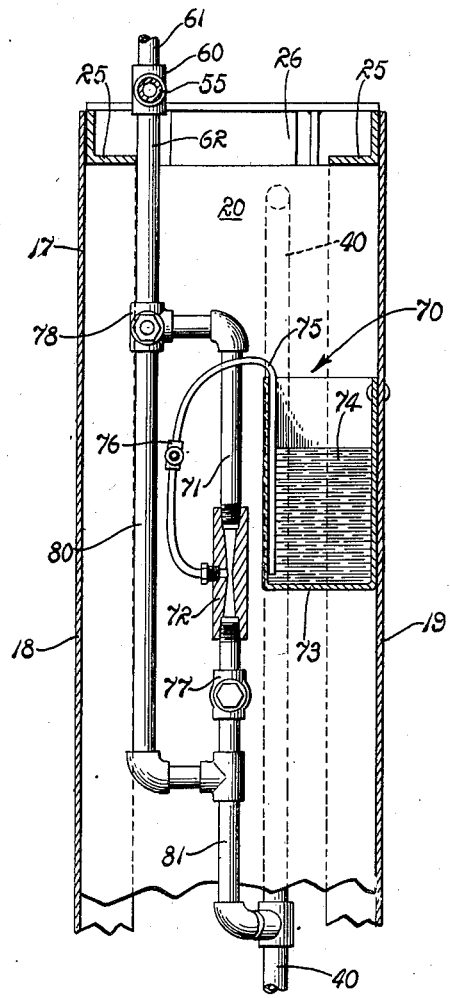
DAIN B. LONES
INVENTOR
HUEBNER, BEEHLER,
WORREL & HERZIG
ATTORNEYS
BY
Richard M. Worrel

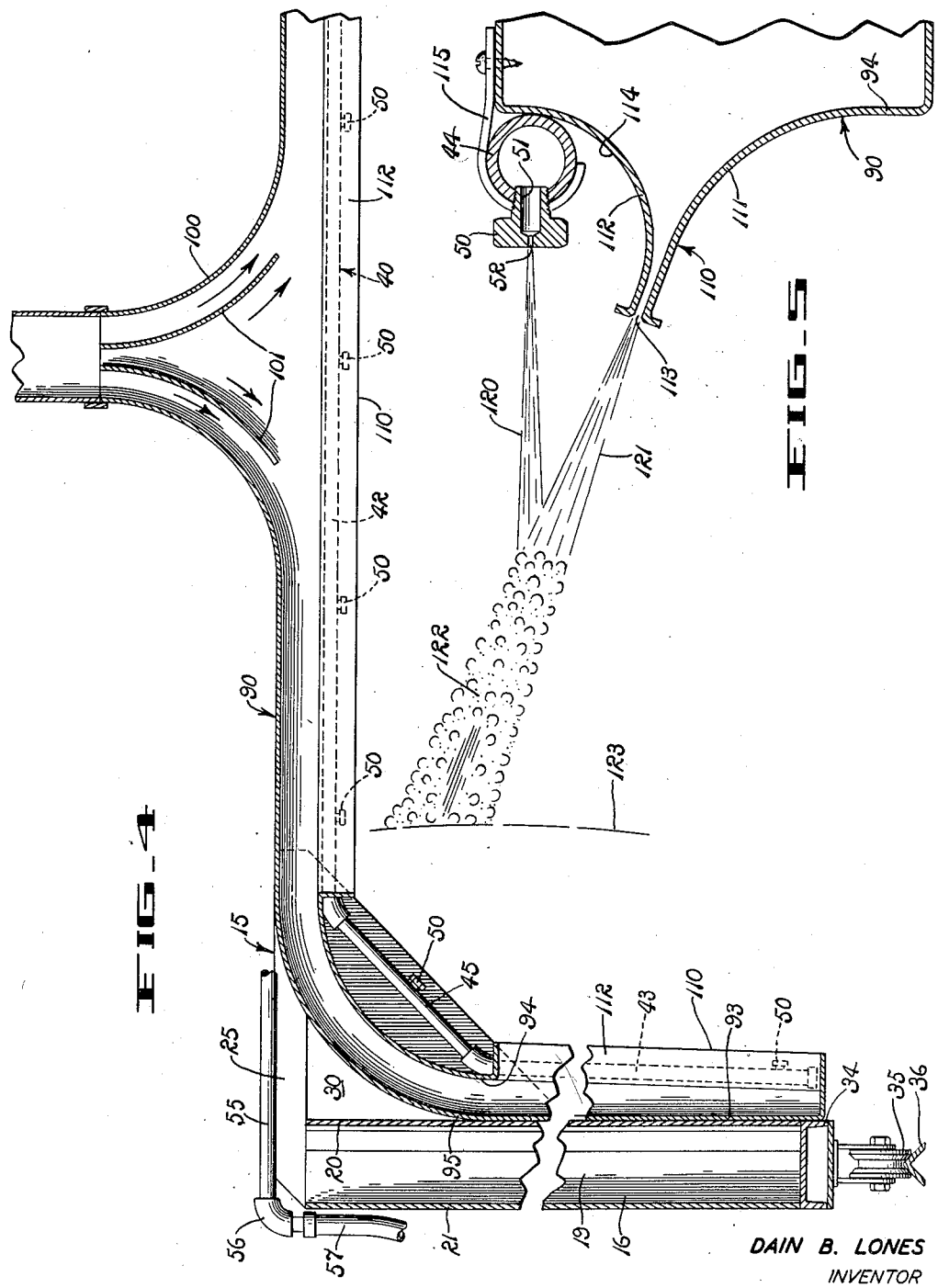

United States Patent Office 2,788,009
Patented Apr. 9, 1957

2,788,009

AUTOMATIC WASHING APPARATUS

Dain B. Lones, Palos Verdes Estates, Calif., assignor to Air-O-Fan Products Corporation, Gilroy, Calif.

Application March 18, 1954, Serial No. 417,129

6 Claims. (Cl. 134—102)

The present invention relates to automatic washing apparatus and in particular to a washer adapted for use in rapidly rinsing, washing and drying vehicles and similar objects.

With few exceptions, a significant majority of auto wash stations wash automobiles by hand using merely a hose, sponge, suitable detergent and water. It is the general experience that even an experienced washer cannot complete a wash job in much less than an hour. The task is time consuming largely because of the extensive areas to be cleansed and their difficulty of access and because of the care which must be given most body finishes. Thus the washer must walk completely around the car simultaneously manipulating a substantial length of hose to thoroughly apply water or detergent to all parts thereof. Because of the danger to most body finishes, the detergent must be applied to small sections or areas of the car body and quickly removed by rinsing before proceeding to the next portion of the car to be washed. Many times in using this sectionalized method of washing a car, detergent spills over onto a part of the car remote from the area being washed and due to inadequate rinsing facilities or because unnoticed, the detergent is allowed to remain long enough to harm the finish. Further, it is well within the knowledge of any car owner, as well as experienced car washers, that the task of washing a car is tedious, time consuming and frequently performed only with considerable discomfort.

Automatic washers are known for performing some of the tasks involved in washing vehicles and the like. Most of these known apparatus spray water or blow air from all sides of the vehicle onto sections of the vehicle thus relieving some of the requisite manually performable operations. These apparatus have been unsuccessful, however, in eliminating the scrubbing action needed to remove road film and other accumulated dirt. The mere application of water by hose or other spraying means even if mixed with a detergent fails to accomplish adequate cleansing without rubbing.

Therefore, it is an object of this invention to provide an automatic washing apparatus for use in washing vehicles and the like which substantially eliminates the need for manual effort or labor effectively to wash a vehicle.

Another object is to provide an automatic washer which minimizes manual rubbing, scrubbing, wiping, brushing and the like against the surface being washed and the labor and difficulties incident thereto.

Another object is to provide a device for automatically washing a vehicle and the like from the initial rinsing to the final drying thereof.

Another object is to provide an automatic washing apparatus which combines the action of air and water and/or air and water mixed with detergent to produce a unique automatic scrubbing action on the surface of the vehicle or other object being washed.

Another object is to provide substantially uniform application of air and water and/or detergent to all sides of the object being washed in an automatic washing apparatus.

Another object is to provide an automatic washing apparatus which is relatively simple in construction, easy to operate, efficient in performance and one which reduces to a fraction the usual length of time required to wash a vehicle such as an automobile.

These and other objects will be more apparent upon reference to the following description and accompanying drawings.

In the drawings:

Fig. 1 is a front perspective view of the automatic washing apparatus of the present invention shown in use in washing a vehicle such as an automobile illustrated in dot-dash line therein.

Fig. 2 is a vertical cross section taken through the washing apparatus alone as shown in Fig. 1 and looking from a position interiorly of the washing apparatus toward one of the sides thereof.

Fig. 3 is a vertical cross section taken through one of the hollow legs of the washing apparatus showing the mounting arrangement of the detergent additive unit situated therein.

Fig. 4 is a longitudinal section taken through a portion of the washing apparatus as seen in Fig. 1, transversely of the automotive vehicle shown therein.

Fig. 5 is a horizontal cross section taken on line 5—5 in Fig. 1.

Fig. 6 is a diagrammatic view showing the spraying system of this invention and illustrating the manner in which water or detergent mixed with water is introduced into the spraying conduit.

Referring in greater detail to the drawings:

The following description and accompanying drawings describe the invention as usable in the washing of automobiles or other similar vehicles. It will be readily recognized as the description proceeds, that this washing apparatus and the principles involved in its construction are highly effective in many other applications such as the washing of locomotives, buses, tractors, or even stationary objects which are entirely unrelated to vehicles.

Referring to Fig. 1 there is illustrated the automatic washing apparatus 10 of the present invention in use in washing a car 11. The washing apparatus comprises a substantially U-shaped arched frame 15 which is in an inverted upright position. The U-shaped frame includes a pair of substantially erect, rectangular, hollow legs 16 and 17 each of which is provided with a front wall 18, a rear wall 19, an inside wall 20 and an outside wall 21. The U-shaped frame 15 is further provided with a pair of top cross braces 25 which extend between the upper ends of the hollow legs 16 and 17. Conveniently, the cross braces 25 each take the form of angle iron portions or the like which are rigid in nature and resist sagging or bending at the middle of the U-shaped frame 15. The cross braces 25, as stated, are rigidly connected to the tops of the legs 16 and 17 and extend therebetween at the extreme front and rear sides thereof and define an elongated opening 26 between the braces 25. To provide greater rigidity between the braces 25 and each of the legs 16 and 17, gusset plates 30 are attached in each of the four corners at the front and the rear of the U-shaped frame 15.

Each of the legs of the U-shaped frame 15 is mounted or supported on a truck or dolly 34. Each of the trucks or dollies 34 is provided with a pair of grooved wheels or rollers 35 adapted to be received on tracks 36 of suitable shape whereby the U-shaped frame may be rollably wheeled or moved along the tracks 36 and over the car 11 being washed in a desired selective manner and position.

The fluid spraying system of the present invention includes a substantially U-shape fluid conduit 40 which is mounted within the U-shaped arch frame 15 in an inverted upright position and which is of such a length as to be substantially coextensive with the U-shaped frame 15. The conduit 40 includes a top conduit section 42 which extends substantially coextensively with the top cross braces 25 of the frame 15 and a pair of side sections 43 and 44 which extend down the inside walls 20 of the legs 16 and 17 of the frame 15 and which are also substantially coextensive therewith. A pair of corner conduit sections 45 and 46 mounted at a substantially similar angle to the gusset plates 30 connect the top conduit section 42 to the side conduit sections 43 and 44 of the U-shaped fluid conduit 40. The top section 42 is mounted on any convenient bracket, such as that indicated at 47, extending between the top cross braces 25 and providing a downwardly dependent member 48 for connection to a strap or clamp 49 which is wrapped around, or otherwise conveniently secured, to the top conduit section 42. The side conduit sections 43 and 44 of the U-shaped conduit 40 are held in position along the inside walls of the U-shaped frame 15 in a manner which will be subsequently described.

The U-shaped fluid conduit 40 is provided with a plurality of spray nozzles 50 spaced at convenient intervals therealong. Each of the nozzles 50 is secured into the U-shaped fluid conduit 40 by a threaded connection or other suitable means and is provided with a bore 51 communicating with the interior of the fluid conduit 40 and is further provided with a short jet opening 52 for directing a spray of water in a fine stream outwardly thereof. Since the U-shaped fluid conduit 40 itself lies substantially within the same erect vertical plane, the axial lines of each of the jet openings 52 lie in substantially the same common erect plane and thus, when each of the nozzles 50 is spraying fluid inwardly of the U-shaped frame 15 in the manner shown in Fig. 1, this spray saturates an area defined within the frame. It is further to be noted that the plane of this spray of fluid is preferably directed perpendicularly toward the vehicle.

The fluid system of this invention further includes an elongated conduit 55 which is supported in a substantially horizontal position above the U-shaped frame 15 and rests on the bracket 47 which extends between the cross braces 25 of the frame 15. The outer ends of the elongated conduit 55 are provided with elbows 56 and a hand hose 57 is threadably attached to each of these elbows 56. The other or free end of each of the hoses 57 is provided with a hand-operated nozzle 58 having an operating lever.

A hanger 59 is attached to the front wall 18 of each leg 16 and 17 on which the levers of the operating handles 58 may be hooked. Therefore, when the hoses 57 are not in use they may be hung up on the hangers 59 and the hoses twisted to fold against the outside surfaces 21 of each leg out of the way from the spraying apparatus. Yet each hose is conveniently accessible from either side of the vehicle 11 when a special application of water is needed to wash surfaces of the car inaccessible to the spray nozzles 40. These hand hoses are particularly useful in cleaning the wheels, tire, hubcaps and the underside of the fenders of the vehicle.

The elongated conduit 55 is provided with a cross connection coupling member 60. This coupling member 60 has an upper inlet branch conduit 61 and a lower outlet branch conduit 62, the latter being best seen in Fig. 3. Clearly both the inlet conduit 61 and the outlet conduit 62 are in fluid communication with the elongated conduit 55. The upper inlet branch conduit 61 extends to a convenient supply of water. In this regard, it is significant to note that as the apparatus is being used at the present time, the upper inlet branch conduit 61 is connected to an ordinary domestic water system and is under no unusual or extraordinary high pressure. The upper inlet branch conduit 61, therefore, provides a supply of water to the elongated conduit 55 and therefore to the hand hoses 57 and as will be seen subsequently, the U-shaped conduit 40.

A detergent additive unit 70 for selectively introducing detergent into the stream of water being emitted from the spray nozzles is mounted within the hollow leg 17 of the U-shaped arched frame 15 as best seen in Fig. 3. The detergent system includes a mixing conduit 71 having a venturi mixing valve 72 threaded into the mixing conduit 71. A container 73 is mounted as by welding, or by a bracket not shown, on the rear wall 19 of the leg 17. The container 73 contains a suitable supply of a fluid detergent 74. A flexible, preferably plastic or rubber, hose 75 is immersed in the detergent 74 and extends therefrom for connection to the venturi mixing valve 72. The hose 75 is provided with a check valve 76 for controlling the flow of detergent 74 into the mixing valve. It will be apparent that a siphon action takes place between the container 73 and the mixing valve and thus flow is maintained between these two members. The mixing conduit 71 is also provided with a check valve 77 disposed in the mixing conduit 71 on the outlet side of the venturi mixing valve 72.

The lower outlet branch conduit 62 of the coupling member 60 connects to the inlet side of the mixing conduit 71 through a manual control valve 78. The control valve is provided with a control handle 79, seen in Fig. 1, for selecting either of two positions of operation of the valve 78. In one of these positions, shown in Fig. 6, water fed through conduit 62 is channeled through the valve 78 into the mixing conduit 71 whereby detergent is mixed with the water in the venturi mixing valve 72 and the fluid flowing out of the mixing conduit 71 comprises a mixture of water and detergent. When the manual control handle 79 of the control valve 78 is moved to its other positions of operation, the supply of water into the mixing conduit 71 from the outlet or lower branch conduit 62 is cut off.

A by-pass water conduit 80 is connected to the control valve 78 at one end thereof and at the other end is connected to the outlet side of the mixing conduit 71 on the outlet side of the check valve 77. Thus, with the operating handle 79 in the second position of operation of the control valve 78, water coming from conduit 62 is by-passed through the conduit 80 around the detergent mixing conduit 71. A further outlet connecting conduit 81 connects the outlet of both the water by-pass conduit 80 and the detergent mixing conduit 71 to the inlet of the U-shaped fluid conduit 40. It will be readily apparent, therefore, that depending upon the position of the control handle 79, either water alone may be delivered into the fluid conduit 40 or a mixture of water and detergent may be delivered into the fluid conduit 40 for subsequent emission from the spray nozzles 50.

To provide convenient access to the detergent additive unit 70 mounted within the hollow leg 17 of the frame 15, a hinged door 83 is mounted on the outside wall 21 of the leg 17. The door 83 is provided with an opening 84 through which the control handle 79 of the valve 78 extends for convenient manipulation exteriorly of the leg 17 at the side of the apparatus. Further, an opening is provided for a push-button switch 85 which, though the electrical connections not shown, provides a convenient means for energizing the automatic washing apparatus, in a manner which will be more readily apparent as the description proceeds.

This invention also provides an air blowing system which includes a substantially U-shaped air duct 90 mounted within the U-shaped arched frame 15 in an inverted upright position and, with the U-shaped conduit 40, the duct 90 is of such a length as to extend substantially coextensively with the frame 15. The U-shaped air duct 90 is secured in rigid position within the frame 15 by a plurality of clamps, as 91, which bear against the duct and are connected to the legs 16 and 17 and the brackets 47 on the cross braces 25 of the frame 15. The U-shaped air duct 90 is provided with a top section 92 which extends along the top of the U-shaped frame 15 longitudinally in the opening 26 and beneath the brackets 47. The outer ends of the top duct section 92 are curved and joined to the dependent side leg duct sections 93 of the U-shaped air duct 90. The side leg duct sections 93 are provided with inside and outside walls 94 and 95 respectively which, as will be noted in Fig. 4, converge or taper downwardly and are thus closer together at the bottom of the legs 16 and 17 of the frame 15 than at the upper portions thereof.

The top duct section 92 of the air duct 90 is provided centrally thereof with an upwardly flared neck 100. Disposed interiorly within the neck section of the duct are a pair of baffle plates 101 which direct the flow of air into the top duct section 92 in opposite directions outwardly toward the leg sections 93 of the duct. A blower fan 102 is connected to the neck portion 100 of the duct and a blower motor 103 is operatively connected to the shaft of the blower fan 102 for actuation thereof. A platform 104 is held in position by a convenient number of brackets, such as 105 and provides a convenient means for supporting the blower motor 103 in position adjacent to the blower fan 102.

The U-shaped air duct 90 is provided with a plurality of elongated outlet nozzles, as 110, on each of the leg sections 93 and the top section 92 of the duct. Each of the elongated outlet nozzles 110 is identical in construction and therefore, only the nozzle provided on the leg section 93 of the duct mounted adjacent to the leg 17 of the frame is described. Referring to Fig. 5, the elongated nozzle 110 is provided with forward and rearward arcuate walls 111 and 112, respectively, which are joined to the leg section 93 of the duct and extend inwardly in an arcuate converging manner to form at the innermost position thereof an elongated slot 113. It will be noted that the forward arcuate wall 111 is on a much longer radius than the rearward arcuate wall 112. Thus, the plane or line of direction of a blast of air being emitted from the elongated slot 113 is in a rearward direction from the front wall 18 of the frame 15.

The rearward arcuate wall 112 of the elongated outlet nozzle 110 provides a pocket 114 and it is along the base or outer portion of this pocket that the fluid conduit 40 is mounted as by welding or by means of brackets such as 115. As described hereinabove, the stream of water emitted from the jet 52 of each of the nozzles 50 lies along a common plane which is longitudinally of the frame 15 and substantially perpendicularly directed toward the object to be washed. The direction of emission of the blast of air from the slot 113 is convergently related to the plane of emission of the stream of water from the nozzles 50 and, of course, this plane of air blast is determined by the rearwardly directed attitude of the walls 111 and 112 of the nozzle 110.

Therefore, because of the construction and mounting relation between the elongated nozzle 110 and the plurality of spray nozzles 50, a blast of air being emitted from the slot 113 is adapted to intercept a stream of fluid from the nozzles 50 at a position somewhat beyond an intermediate point between the vehicle 11 being washed and the nozzles themeslves and adjacent to the vehicle 11. The convergence of the fluid spray by the air blast creates a turbulence in the water or other fluid and furthermore adds momentum to the fluid as a result of the high pressure of the blast. Thus the fluid is sprayed against the object being washed under high pressure and with an appreciable amount of turbulence whereby a scrubbing effect or action is produced on the surface of the vehicle.

Operation

The operation of this invention is believed to be readily apparent and is briefly summarized at this point. With the automatic washing apparatus 10 provided by the present invention preferably inactive so that neither air nor fluid nor a combination of either is emitted centrally of the frame 15, a vehicle, such as 11 or other object to be washed, is driven or moved within the U-shaped frame 15 or path of movement of the frame so that the frame encompasses the object being washed in an arched relation thereover. Assuming that the object is an automobile 11 which is covered with grime, mud or other forms of dirt and foreign particles, control valve 79 is turned to the rinse or water-only position and the operating switch 85 is pushed to energize the blower motor 103. Thus water is emitted from the spray nozzles 50 and air is emitted from the nozzles 110 of the air duct 90 to force the spray of water 120 against the sides and top of the vehicle 11. By moving the U-shaped frame 15 along the tracks 36, the entire car 11 may be completely rinsed. Further, both of the hand hoses 57 may be removed from their hooks 59 and utilized to spray the undersides of the fenders of the car, the wheels, hubcaps and other portions which are inaccessible or which are not effectively rinsed by the spray emitted from the fluid conduit 40.

When the car has been completely rinsed, the control valve 79 is turned to the detergent position and with the blower motor 103 still actuated the vehicle is completely sprayed with detergent mixed with water. Because of the turbulence created in the spray of detergent and water, a scrubbing action is produced on the sides and top of the vehicle 11. Again, the entire car may be covered with a spray of detergent and water by rolling the frame along the track 36. If the vehicle is excessively dirty, the apparatus is turned off when a sufficient amount of detergent spray has been applied to the vehicle. It has then been found effective in aggravated cases to "mitt" the car with a glove or sponge to effect a thorough cleansing of the car and a rubbing of the detergent into certain portions of the car which are covered with excessive grime. Although this mitting action by the operator is found desirable in some instances where a car is excessively dirty, the major portion of the scrubbing or rubbing action of the detergent on the surface of the car to effectively remove the grime and other dirt thereon is accomplished by the interaction of the air blast emitted from the nozzles 110 and the stream of fluid 120 emitted from the spray nozzles 50. It will be clear, in any event, that the turbulent spray relieves in a large measure the manual labor of scrubbing by sponge or mitt.

After the layer of grime or dirt on the car has been removed or at least adequately loosened, the control valve 79 is placed in the water or rinse position and the blower motor 103 is again turned on by operation of the switch 85. This applies water only under high pressure of the air blast to the surface of the car to rinse the detergent and loosened dirt therefrom. Again, the frame 15 may be moved along the tracks 36 completely to rinse all of the vehicle.

Finally, the valve 79 is placed in the off position and the blower motor 103 is left on. It will be evident that so adjusted only air is blown onto the surfaces washed. The frame 15 is again moved forwardly and rearwardly on the track 36 and all the excess water is blown from, or dried off, the surfaces of the vehicle.

The invention described has been highly successful in practical operation, for example, reducing the washing time of automobiles substantially covered with mud to less than fifteen minutes. It is easily handled by one person with a minimum of manual effort and without any appreciable spraying of fluid on the operator or those standing near the apparatus. It is further adapted for convenient dismantling and erection and when erected is easily stored or positioned against the wall of a building.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An automatic car washing apparatus comprising a substantially U-shaped frame adapted to span the body of a car and having a front side and a rear side, the U-shaped frame having a pair of hollow legs providing opposed inside surfaces; a pair of wheeled trucks, each of the legs of the U-shape frame being supported on one of the trucks; a pair of tracks receiving the wheeled trucks to enable slidable movement of the U-shaped frame relative to the car; a substantially U-shaped fluid conduit coextensively fitted within the U-shaped frame being provided with an inlet opening and a plurality of outlet nozzles spaced along the conduit for directing fluid inwardly of the frame; a detergent additive unit mounted in one of the hollow legs of the U-shaped frame comprising an inlet conduit and an outlet conduit, the outlet conduit being connected to the inlet opening of the U-shaped fluid conduit, a source of water under pressure connected to the inlet conduit of the detergent additive unit, the detergent additive unit including a control valve having a first controlled position in which detergent is added to the water entering through the inlet conduit for transmission of a mixture of detergent and water to the U-shaped fluid conduit and a second position in which only water is supplied to the fluid conduit from the inlet conduit; a substantially U-shaped air duct coextensively mounted within the U-shaped frame and having a pair of side sections substantially coextensive with the hollow legs of the U-shaped frame and a central top section connecting the side sections of the duct, each of the side sections and the top section being provided with an elongated nozzle directed inwardly of the frame, each of the elongated nozzles comprising a pair of arcuate walls connected to the respective sections of the air duct and converging inwardly thereof to form slots extending longitudinally of the respective section of the duct, the arcuate walls forming the elongated slots also being directed rearwardly of the U-shaped frame along a plane angularly related to the plane in which the axes of the spray nozzles lie, each of the side sections of the air duct being downwardly convergent whereby a substantially uniform blast of air is emitted from the elongated nozzles; and a blower connected to the central top section of the air duct for supplying air under pressure thereto.

2. An automatic car washing and scrubbing apparatus comprising a substantially U-shaped frame adapted to span the body of a car having a pair of downwardly extended legs; a substantially U-shaped air duct coextensively mounted within the U-shaped frame, having a pair of side sections substantially coextensive with the legs of the U-shaped frame and a central top section connecting the side sections of the duct, each of the side sections and the top section being provided with an elongated nozzle defining an elongated air passageway lying along a plane directed inwardly of the frame, each of the elongated nozzles comprising a pair of arcuate walls integrally connected to the respective section of the air duct and converging inwardly thereof to form said passageways, one of the arcuate walls having a radius of curvature less than the other wall; a substantially U-shaped fluid conduit coextensively fitted within the U-shaped frame being mounted on the air duct along the arcuate walls associated with the respective sections of the air duct having the lesser radius of curvature, a plurality of outlet spray nozzles connected along the fluid conduit adjacent to the air nozzles defining spray axes directed inwardly of the frame collectively lying in a common plane disposed at an acute angle to the plane of the air passageway adjacent thereto thereby to cause the individual fluid spray emitted therefrom to converge with wide air blasts discharged from the air nozzles at an area beyond an intermediate point between the car being washed and the frame and closely adjacent to the car in order to effect a turbulent scrubbing action on the car.

3. An automatic car washing apparatus comprising an arched frame adapted to span the body of a car and having a front side and a rear side, the frame having a pair of legs providing opposed inside surfaces; means supporting the frame in upright position; and arched fluid conduit coextensively fitted within the frame being provided with an inlet opening and a plurality of outlet nozzles spaced along the conduit for directing fluid inwardly of the frame; and an arched air duct coextensively mounted within the frame and having a pair of side sections substantially coextensive with the legs of the frame and a central top section connecting the side sections of the duct, each of the side sections and the top section being provided with an elongated nozzle directed inwardly of the frame, each of the elongated nozzles comprising a pair of arcuate walls connected to the respective sections of the air duct and converging inwardly thereof to form slots extending longitudinally of the respective section of the duct, the arcuate walls forming the elongated slots also being directed rearwardly of the frame along plane angularly related to the plane in which the axes of the spray nozzles lie so that fluid spray from the spray nozzle is intercepted by air from the air nozzles, each of the side sections of the air duct being downwardly convergent whereby a substantially uniform blast of air is emitted from the elongated nozzles; and a blower connected to the air duct for supplying air under pressure thereto.

4. An apparatus for washing and scrubbing the exterior surface of a vehicle comprising an arched frame mounted in a substantially erect position and adapted to span a vehicle disposed therewithin, an arched air duct mounted in the frame also adapted to span a vehicle disposed within the frame and having a pair of elongated substantially erect side air nozzles and an elongated substantially horizontal top air nozzle adapted to extend along the sides and top, respectively, of a vehicle within the frame so as to direct substantially longitudinally continuous blasts of air inwardly of the frame along predetermined planes; means supplying air under pressure to the air conduit; an arched fluid conduit mounted within the frame adapted to span a vehicle disposed within the frame and having side and top sections lying along the side and top air nozzles, respectively, of the air duct; a plurality of fluid conducting nozzles connected in longitudinally adjacent spaced relation to the fluid conduit along the top and side sections thereof providing outlet orifices directed inwardly of the frame and having spray axes acutely angularly related to the planes of the blasts of air of their respectively adjacent air nozzles so as to discharge substantially longitudinally continuous overlapping streams of fluid which converge with the blasts of air of their respectively adjacent air nozzles at positions more than halfway between the vehicle surface being cleaned and the frame and closely adjacent to such surface, the air nozzles collectively providing a substantially continuous arch-shaped blast of air converging with a substantially continuous arch-shaped stream of fluid from the nozzles to create a turbulence in such stream whereby a turbulent scrubbing is effected on the vehicle surface.

5. An automatic vehicle washing and scrubbing apparatus comprising an arched frame having inner and outer sides and a pair of downwardly extended legs and being adapted to span a vehicle; a pair of side air ducts mounted along the legs of the frame interconnected by a central top air duct, each of the side ducts and the top duct being provided with an elongated nozzle defining an elongated air passageway lying along a plane directed inwardly of the frame, each of the elongated nozzles comprising a pair of arcuate walls integrally connected to its respective air duct and converging inwardly thereof to form said air passageways, one of the arcuate walls having a radius of curvature less than the other wall; fluid conduits mounted in the frame along the arcuate walls of the air ducts having the lesser radii of curvature; and a plurality of outlet spray nozzles connected to the fluid conduits adjacent to the air nozzles defining spray axes directed inwardly of the frame at an acute angle to the plane of the air passageway adjacent thereto thereby to cause the individual fluid sprays emitted therefrom to converge with a wide air blast discharged from the air nozzles at a position more than halfway between the vehicle being washed and the frame and closely adjacent to the vehicle in order to effect a turbulent scrubbing action thereon.

6. An apparatus for washing and scrubbing the exterior surface of an object to be washed comprising an arched frame mounted in a substantially erect position and adapted to span such an object disposed therein, an arched air duct mounted in the frame also adapted to span such object disposed within the frame and having a pair of elongated substantially erect side air nozzles and an elongated substantially horizontal top air nozzle adapted to extend along the sides and top, respectively, of such object within the frame so as to direct substantially longitudinally continuous blasts of air inwardly of the frame along predetermined planes; means supplying air under pressure to the air conduit; an arched fluid conduit mounted within the frame adapted to span such object disposed within the frame and having side and top sections lying along the side and top air nozzles, respectively, of the air duct; a plurality of fluid conducting nozzles connected in longitudinally adjacent spaced relation to the fluid conduit along the top and side sections thereof providing outlet orifices directed inwardly of the frame and having spray axes acutely angularly related to the planes of the blasts of air of their respectively adjacent air nozzles so as to discharge substantially longitudinally continuous overlapping streams of fluid which converge with the blasts of air of their respectively adjacent air nozzles at positions more than halfway between the surface of the object being cleaned and the frame and closely adjacent to such surface, the air nozzles collectively providing a substantially continuous arch-shaped blast of air converging with a substantially continuous arch-shaped stream of fluid from the nozzles to create a turbulence in such stream whereby a turbulent scrubbing is effected on the surface of the object.

References Cited in the file of this patent
UNITED STATES PATENTS

| | | |
|---|---|---|
| 1,674,064 | Ridley | June 19, 1928 |
| 1,888,791 | Cole | Nov. 22, 1932 |
| 1,934,494 | Gillespie | Nov. 7, 1933 |
| 2,139,628 | Terry | Dec. 6, 1938 |
| 2,394,760 | Felton | Feb. 12, 1946 |
| 2,440,157 | Rousseau | Apr. 20, 1948 |
| 2,465,562 | Hopper | Mar. 29, 1949 |
| 2,608,792 | Chater | Sept. 2, 1952 |